(12) United States Patent
Budack et al.

(10) Patent No.: US 9,506,410 B2
(45) Date of Patent: Nov. 29, 2016

(54) METHOD FOR OPERATING AN INTERNAL COMBUSTION ENGINE AND INTERNAL COMBUSTION ENGINE

(71) Applicant: Audi AG, Ingolstadt (DE)

(72) Inventors: Ralf Budack, Ingolstadt (DE); Michael Kuhn, Hitzhofen (DE); Peter Senft, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 365 days.

(21) Appl. No.: 14/411,021

(22) PCT Filed: Jan. 28, 2013

(86) PCT No.: PCT/EP2013/000239
§ 371 (c)(1),
(2) Date: Dec. 23, 2014

(87) PCT Pub. No.: WO2013/110469
PCT Pub. Date: Aug. 1, 2013

(65) Prior Publication Data
US 2015/0192077 A1    Jul. 9, 2015

(30) Foreign Application Priority Data

Jan. 27, 2012  (DE) .................. 10 2012 001 650

(51) Int. Cl.
| F02M 21/02 | (2006.01) |
| --- | --- |
| F02B 3/06 | (2006.01) |
| F02D 19/06 | (2006.01) |
| F02M 69/04 | (2006.01) |
| F02D 13/02 | (2006.01) |
| F02D 41/00 | (2006.01) |
| F02M 43/00 | (2006.01) |
| F02B 69/04 | (2006.01) |

(52) U.S. Cl.
CPC .......... F02D 19/0615 (2013.01); F02B 69/04 (2013.01); F02D 13/0226 (2013.01);
(Continued)

(58) Field of Classification Search
CPC ............... F02B 69/04; F02D 13/0226; F02D 13/0234; F02D 19/0607; F02D 19/0613; F02D 19/0615; F02D 19/0642; F02D 19/0647; F02D 19/0692; F02D 2041/001; F02D 41/0025; F02D 41/0027; F02M 43/00; F02M 69/046
USPC .................... 123/300, 27 GE, 525, 531, 575
See application file for complete search history.

(56) References Cited

U.S. PATENT DOCUMENTS

| 5,224,457 A * | 7/1993 | Arsenault ............... F02B 43/00 |
| --- | --- | --- |
| | | 123/27 GE |
| 5,228,423 A | 7/1993 | Oikawa et al. |

(Continued)

FOREIGN PATENT DOCUMENTS

| DE | 101 60 057 | 6/2003 |
| --- | --- | --- |
| DE | 102007013686 | 9/2008 |
| JP | 2003-013726 | 1/2003 |
| WO | WO 2008/046486 | 4/2008 |

OTHER PUBLICATIONS

International Search Report issued by the European Patent Office in International Application PCT/EP2013/000239 on Apr. 15, 2013.

*Primary Examiner* — Marguerite McMahon
*Assistant Examiner* — Tea Holbrook
(74) *Attorney, Agent, or Firm* — Henry M. Feiereisen LLC

(57) ABSTRACT

A method for operating an internal combustion engine includes a fuel supply device for at least one first and one second fuel, wherein the internal combustion engine has at least one cylinder which includes at least one intake valve and into which air, in particular fresh air, can be supplied via an intake pipe. In a first operating mode of the internal combustion engine, the first fuel is introduced only into the intake pipe, and in a second operating mode, the second fuel is exclusively introduced directly into the cylinder, and in the second operating mode an intake valve opening time period is adjusted to be shorter than in the first operating mode.

15 Claims, 1 Drawing Sheet

(52) U.S. Cl.
CPC ....... *F02D13/0234* (2013.01); *F02D 19/0607* (2013.01); *F02D 19/0613* (2013.01); *F02D 19/0642* (2013.01); *F02D 19/0647* (2013.01); *F02D 19/0692* (2013.01); *F02D 41/0025* (2013.01); *F02M 43/00* (2013.01); *F02M 69/046* (2013.01); *F02D 41/0027* (2013.01); *F02D 2041/001* (2013.01); *Y02T 10/18* (2013.01); *Y02T 10/36* (2013.01)

(56) References Cited

U.S. PATENT DOCUMENTS

| | | | |
|---|---|---|---|
| 7,051,700 B2* | 5/2006 | Kuzuyama | F02D 13/0207 123/299 |
| 8,555,852 B2* | 10/2013 | Munshi | F02B 43/10 123/27 GE |
| 2003/0116133 A1 | 6/2003 | Hertweck et al. | |
| 2006/0201152 A1* | 9/2006 | Irisawa | F02D 13/0226 60/605.1 |
| 2009/0241905 A1* | 10/2009 | Tomiita | F02M 35/10177 123/470 |
| 2010/0332106 A1* | 12/2010 | Vanderslice | F02D 19/0631 701/103 |
| 2011/0126797 A1 | 6/2011 | Russell | |
| 2011/0132290 A1* | 6/2011 | Leone | F02B 43/12 123/3 |
| 2011/0137537 A1* | 6/2011 | Leone | F02D 41/0027 701/102 |
| 2013/0179050 A1* | 7/2013 | Munshi | F02B 43/10 701/104 |
| 2013/0255636 A1* | 10/2013 | Pursifull | F02D 19/0613 123/446 |

* cited by examiner

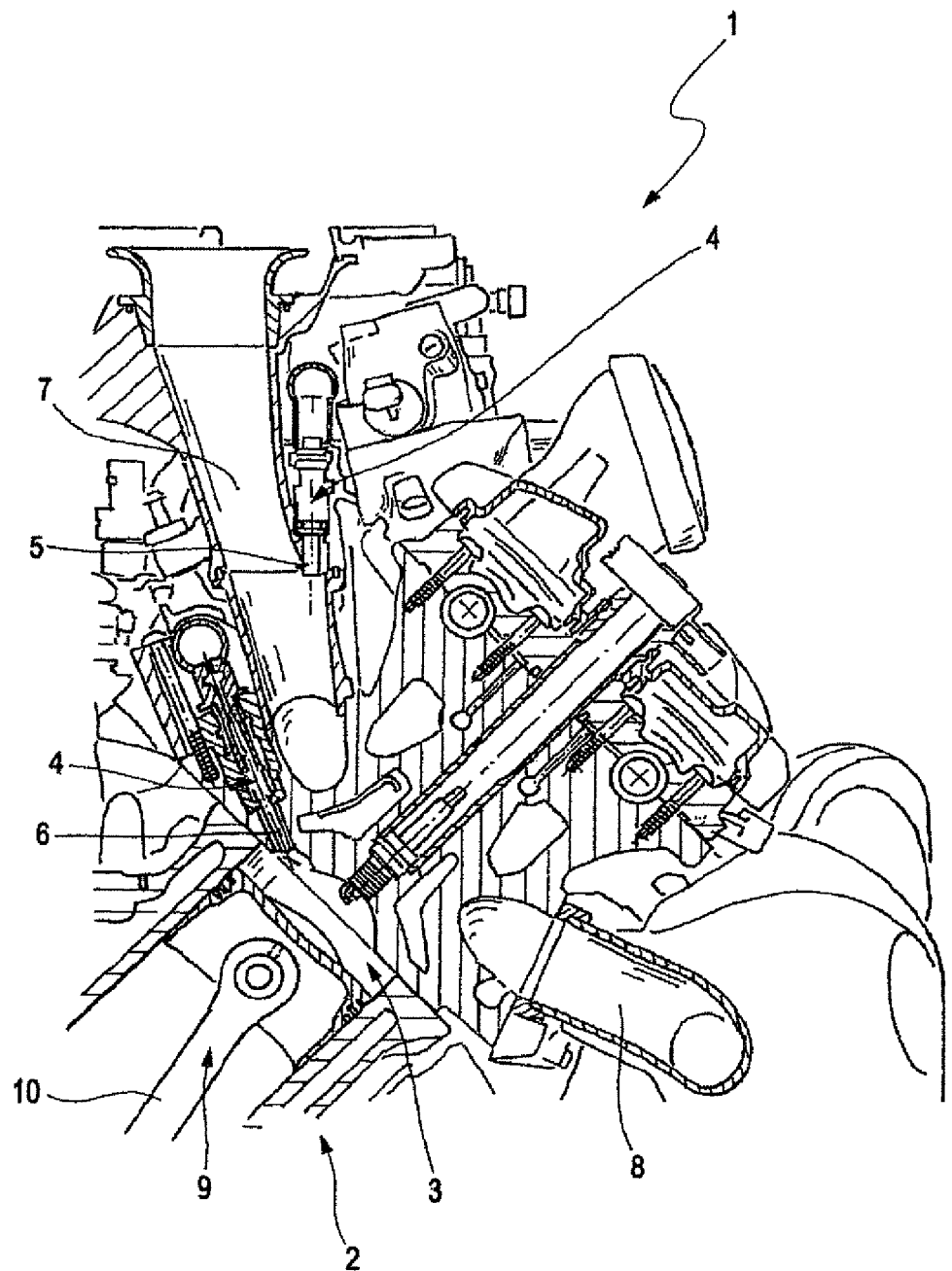

METHOD FOR OPERATING AN INTERNAL COMBUSTION ENGINE AND INTERNAL COMBUSTION ENGINE

CROSS-REFERENCES TO RELATED APPLICATIONS

This application is the U.S. National Stage of International Application No. PCT/EP2013/000239, filed Jan. 28, 2013, which designated the United States and has been published as International Publication No. WO 2013/110469 and which claims the priority of German Patent Application, Serial No. 10 2012 001 650.6, filed Jan. 27, 2012, pursuant to 35 U.S.C. 119(a)-(d).

BACKGROUND OF THE INVENTION

The invention relates to a method for operating an internal combustion engine with a fuel supply device for at least a first and a second fuel, wherein the internal combustion engine includes at least one cylinder which has at least one intake valve and to which air, in particular fresh air, can be supplied via an intake pipe. The invention further relates to an internal combustion engine.

Methods of the afore-stated type are known in the art. The internal combustion engine includes the cylinder which is provided with the at least one intake valve. Connected to the intake valve on the side facing away from the cylinder is the intake pipe via which air can be supplied to the intake valve and thus also to the cylinder. The air is preferably fresh air or includes at least a proportion of fresh air. In principle, the air may also include at least a proportion of exhaust gas that results from an exhaust gas recirculation. Furthermore, the internal combustion engine includes the fuel supply device by which fuel can be fed into the cylinder for subsequent combustion.

Basically, it can be differentiated between direct injection and manifold injection. In direct injection, fuel is supplied directly into the cylinder or a combustion chamber of the cylinder. Conversely, in manifold injection, fuel is first supplied to the intake pipe from which it enters together with air through the intake valve into the cylinder or its combustion chamber. Direct injection thus represents a direct fuel supply and manifold injection an indirect fuel supply into the cylinder or the combustion chamber. In direct injection, only air is preferably supplied to the cylinder; formation of a mixture of air and fuel takes place directly in the combustion chamber. Direct injection enables in particular an operation in the presence of excess air so that a reduction in fuel consumption can be realized. In manifold injection on the other hand, the mixture formation of air and fuel occurs already in the intake pipe, resulting in the formation of a very homogenous mixture.

The internal combustion engine introduced here is designed for operation with different fuels, that is at least the first fuel and the second fuel which differs from the first fuel. For example, the first fuel is a gaseous fuel and the second fuel is a liquid fuel. Operation of the internal combustion engine with gaseous fuel has the advantage that a $CO_2$ emission reduction by about 25% can be realized. Internal combustion engines designed for operation with liquid fuel are normally adapted to suit the operation with gaseous fuel. As the different fuels normally exhibit very different properties, significant advantages can be realized, when the internal combustion engine is suited to only one of the fuels.

For example, gaseous fuel exhibits a very high anti-knock property so that fuel consumption can be significantly reduced, when the internal combustion engine is suited to only gaseous fuel. However, as the internal combustion engine should be able to operate with both fuels, it is necessary to adapt the internal combustion engine to all intended fuels. The totality of fuels contemplated for the operation thus determines the configuration of the internal combustion engine. Accordingly, the higher anti-knock property of the gaseous fuel cannot be exploited because the liquid fuel usually exhibits a substantially lower anti-knock property.

SUMMARY OF THE INVENTION

Object of the invention is therefore to introduce a method with which, despite differences in properties of the fuels, the internal combustion engine can be operated with any of the fuels at a low consumption.

This is attained according to the invention by feeding the first fuel in a first operating mode of the internal combustion engine solely into the intake pipe and the second fuel in the second operating mode exclusively directly into the cylinder, and by adjusting an intake valve opening time period shorter in the second operating mode than in the first operating mode. The internal combustion engine can thus be operated in several operating modes, at least in the first operating mode and in the second operating mode. In the first operating mode, the internal combustion engine shall be operated exclusively with the first fuel and in the second operating mode exclusively with the second fuel. Supply of the fuel should thus be implemented in different ways. In the first operating mode, provision is made for supply of the first fuel exclusively into the intake pipe, so that the first fuel together with air enters only indirectly via the intake valve the cylinder or its combustion chamber. Conversely, in the second operating mode, the second fuel shall be supplied directly into the cylinder. The entire amount of the second fuel to be supplied is hereby fed to the cylinder, thus providing an exclusive supply into the cylinder.

However, this means that in the first operating mode, the first fuel fed into the intake pipe displaces air there, so that at same intake valve opening time period, a smaller amount of air can be supplied to the cylinder than in the second operating mode in which the (second) fuel feeds directly into the cylinder. Accordingly, the intake valve opening time period, i.e. the time period or crankshaft rotation angle, via which the intake valve is at least partially opened, is adjusted shorter in the second operating mode than in the first operating mode, particularly when the desired torque is the same. In this manner, the specific disadvantage of the first fuel is compensated over the longer intake valve opening time period. Accordingly, the same filling of the cylinder with air can be realized in the first operating mode as in the second operating mode. The intake valve opening time period can be either defined by a time difference or a difference in crankshaft rotation angle.

When selecting the intake valve opening time period, it is preferable to also take into account that the first fuel vaporizes, when fed into the intake pipe, so that air within the intake pipe is cooled down. As a result, air density increases so that a greater mass of air can be fed to the cylinder as a result of the supply of the first fuel into the intake pipe while keeping a constant volume. This effect compensates, at least in part, the displacement of air by the first fuel.

According to a refinement of the invention, the first fuel is a gaseous fuel, in particular natural gas or liquefied gas, and the second fuel is a liquid fuel, in particular gasoline. As already described above, the first fuel is preferably a gas or a gaseous fuel. This may involve, for example, compressed natural gas (CNG: Compressed Natural Gas) of liquefied gas (LPG: Liquefied Petroleum Gas). The second fuel is, for example, the afore-stated liquid fuel, wherein in particular gasoline, diesel, ethanol or the like is being used. The gaseous fuel and the liquid fuel essentially exhibit the property that they are either in gaseous form or liquid across the entire temperature range for which the internal combustion engine is designed.

According to a refinement of the invention, the intake valve opening time period for the first and second operating modes is selected such that the cylinder is supplied with an amount of air needed to realize a particular fuel-air-ratio. The internal combustion engine has a predefined desired torque for its operation. This desired torque forms the basis for determining especially the amount of fuel to be supplied into the cylinder and the fuel-air-ratio that is to be utilized hereby. These variables establish subsequently the necessary amount of air. The fuel-air-ratio is selected in particular in such a way that fuel consumption and/or pollutant emission of the internal combustion engine is kept as low as possible. The necessary amount of air then is determinative for the intake valve opening time period, with preferably at least one further parameter being considered. This further parameter involves, for example, the temperature of air supplied to the intake pipe. With the assistance of this parameter, cooling down, caused by feeding the first fuel into the intake pipe, can be taken into account, when determining the intake valve opening time period.

According to a refinement of the invention, the intake valve opening time period for the first and the second operating modes is selected such that a maximum torque of the first and the second operating modes is identical. The maximum torque describes the torque which can be maximally realized in the first and second operating modes, respectively. The desired torque is normally set for the internal combustion engine for its operation. When a desired maximum torque is predefined, i.e. a torque that corresponds to the maximum attainable torque of the internal combustion engine, the actual torque, delivered by the internal combustion engine, shall be identical for the first and second operating modes and correspond to the respective maximum torques. The maximum attainable actual torque is thus the same for the first and the second operating modes.

According to a refinement of the invention, the intake valve opening time period extends from an intake valve opening time instance to an intake valve closing time instance, with the intake valve closing time instance being selected in dependence on the torque of the internal combustion engine and/or with the intake valve opening time instance in the first and the second operating modes being selected equally at same torque of the internal combustion engine. The afore-described variation of the intake valve opening time period, i.e. the shorter adjustment of the intake valve opening time period in the second operating mode, is implemented in particular by the respective selection of the intake valve closing time instance in dependence on the torque. In addition, or as an alternative, the variation of the intake valve opening time period may be realized via the selection of the intake valve closing time instance, in particular exclusively. The intake valve opening time instance is identical in the latter case for both operating modes, but may, of course, depend on the operating point of the internal combustion engine, i.e. in dependence on the torque of the internal combustion engine. The torque is hereby, for example, the desired torque set for the internal combustion engine or the momentarily generated actual torque.

According to a refinement of the invention, the intake valve opening time period is adjusted continuously or discretely. In principle, the intake valve opening time period can be adjusted in any manner. Particularly preferred is, of course, a continuous adjustment so that the amount of air fed into the cylinder can be influenced continuously. A discrete adjustment may, however, also be provided depending on the intake valve or its control, so that the intake valve opening time period can have only specific lengths that are delimited from each other. These different lengths of the intake valve opening time period are preferably established when the internal combustion engine is designed and thereafter are simply selected during operation.

According to a refinement of the invention, a higher effective compression ratio is adjusted for the cylinder in the first operating mode than in the second operating mode. This is especially the case, when the first fuel has a higher anti-knock property than the second fuel. This usually applies, for example, when gaseous fuel is the first fuel and liquid fuel is the second fuel. By realizing the higher effective compression ratio in the first operating mode, a significantly lower consumption is attained. Especially in combination with the shorter selection of the intake valve opening time period in the second operating mode, consumption and pollutant emission are lowered by the internal combustion engine for both operating modes.

Adjustment of the effective compression ratio can basically be realized in any manner. The effective compression ratio is influenced by both the geometric compression ratio and the filling or air filling. A first embodiment involves adjustment of the geometric compression ratio to the desired value. For example, the internal combustion engine includes for this purpose a respective device. In particular, the connecting rod attached to a piston that moves in the cylinder is equipped with an adjustment device. As an alternative, the crank drive can, of course, also include respective adjustment mechanisms.

In a particularly simple manner, the effective compression ratio may be adjusted as desired by keeping the geometric compression ratio constant and adjusting only the effective compression ratio through respective selection of the intake valve opening time period, so that the filling of the cylinder with air during air intake cycle or induction cycle, is altered. Since the intake valve opening time period is adjusted shorter in the second operating mode than in the first operating mode, less amount of air is fed into the cylinder. Accordingly, during the subsequent compression stroke, the effective compression ratio is smaller even though the geometric compression ratio remains constant. Especially advantageous is a combination of the two approaches, in which both the geometric compression ratio and the air filling are adjusted for realizing the desired effective compression ratio.

According to a refinement of the invention, the first fuel is supplied solely into the intake pipe in a third operating mode, and the intake valve opening time period is adjusted in correspondence with the second operating mode. In addition to the two afore-described operating modes, the internal combustion engine is also configured for operation in the third operating mode. During the latter, the first fuel—analog to the first operating mode—is exclusively fed into the intake pipe. In addition, the intake valve opening time period is adjusted in correspondence with the second operating mode, i.e. shorter than in the first operating mode. The third operating mode is carried out preferably at a partial load operation of the internal combustion engine so long it is conceivable that reduction in fuel consumption and/or emission of pollutants can be realized in this manner. In the third operating mode, a dethrottling of the internal combustion engine is thus realized. As an alternative, provision may be made to also feed in the third operating mode the first fuel solely directly into the cylinder.

The invention further relates to an internal combustion engine with a fuel supply device for at least a first and a second fuel, in particular for carrying out the method according to the description above, wherein the internal combustion engine includes at least one cylinder which has an intake valve and to which air, in particular fresh air, can be supplied via an intake pipe. The internal combustion engine is configured for this purpose to feed in a first operating mode of the internal combustion engine the first fuel solely into the intake pipe and to feed in a second operating mode the second fuel exclusively directly into the cylinder, and to adjust in the second operating mode an intake valve opening time period which is shorter than in the first operating mode. The advantages that are attained with such an internal combustion engine have already been described above. The method by which the internal combustion engine is operated can be further refined according to afore-described implementations. Accordingly, the description with respect to the internal combustion engine is, of course, also applicable to the method.

According to a refinement of the invention, the fuel supply device includes a first fuel line for the first fuel and a second fuel line for the second fuel, with the first fuel line being connected with its side facing away from a first fuel tank solely to an intake pipe feed device or to both an intake pipe feed device and a cylinder direct feed device, and with the second fuel line being connected with its side facing away from a second fuel tank exclusively to the cylinder direct feed device. The fuel supply device thus includes the first fuel line, the second fuel line, the intake pipe feed device and the cylinder direct feed device. The first fuel line establishes a flow communication between the first fuel tank for the first fuel and solely the intake pipe feed device, or, alternatively, between both the intake pipe feed device and the cylinder direct feed device. Conversely, the second fuel line establishes a flow communication between the second fuel tank for the second fuel and exclusively the cylinder direct feed device. Accordingly, provision may be made to supply the first fuel exclusively to the intake pipe feed device via the first fuel line, and to supply the second fuel exclusively to the cylinder direct feed device via the second fuel line.

As an alternative, provision may, however, be made to supply the first fuel via the first fuel line to either only the intake pipe feed device or only the cylinder direct feed device. The former is provided particularly for the first operating mode and the latter for the third operating mode. The intake pipe feed device is provided to supply or inject the fuels, respectively fed thereto, into the intake pipe. Accordingly, the intake pipe feed device is configured for direct supply or injection of the fuel, fed thereto, into the cylinder or its combustion chamber.

BRIEF DESCRIPTION OF THE DRAWING

The invention will now be explained in more detail with reference to the exemplary embodiments illustrated in the drawings, without limiting the scope of the invention. It is shown in the sole FIG. 1 a schematic section view of an area of an internal combustion engine with a fuel supply device.

DETAILED DESCRIPTION OF PREFERERRED EMBODIMENTS

FIG. 1 shows a section view of an area of an internal combustion engine 1. The internal combustion engine 1 has a cylinder 2 with a combustion chamber 3. Furthermore, the internal combustion engine 1 includes a fuel supply device 4. The fuel supply device 4 includes an intake pipe feed device 5 and a cylinder direct feed device 6. The intake pipe feed device 5 enables the introduction or injection of fuel supplied thereto into an intake pipe 7 of the internal combustion engine 1. The intake pipe 7 ports into the cylinder 2 or its combustion chamber 3 and thus forms an intake channel for air or a fuel-air-mixture. The cylinder direct feed device 6 enables the introduction or injection of respective fuels supplied thereto directly into the cylinder 2 or into the combustion chamber 3.

The internal combustion engine 1 has an exhaust line 8 via which exhaust gases accumulating in the cylinder 2 can be discharged. The exhaust line 8 thus forms an outlet channel. Associated to its cylinder 2 is also at least one intake valve and an outlet valve (both not shown). The intake valve is able to clear or close a flow communication from the intake pipe 7 to the cylinder 2. Likewise, with the assistance of the outlet valve, the flow communication from the cylinder 2 to the exhaust line 8 can be cleared or cut. The FIGURE also shows a piston 9 of the internal combustion engine, which piston is movably arranged in the cylinder 2. The piston 9 is operationally connected to a camshaft, not shown here, of the internal combustion engine 1 via a connecting rod 10.

The internal combustion engine 1 is configured for operation with a number of different fuels. The fuel supply device 4 thus includes at least a first and a second fuel tank for storing first and second fuels. The internal combustion engine 1 can now be operated in varying operating modes, with the internal combustion engine 1 operating in a first operating mode only with the first fuel and exclusively with the second fuel in a second operating mode. Provision is hereby made for feeding the first fuel in the first operating mode solely into the intake pipe 7 and feeding the second fuel in the second operating mode solely directly into the cylinder 2. Accordingly, the first fuel is supplied only to the intake pipe feed device 5 in the first operating mode, and the second fuel is supplied only to the cylinder direct feed device 6 in the second operating mode.

In addition, an intake valve opening time period shall be adjusted shorter in the second operating mode than in the first operating mode. The intake valve opening time period relates to the time period in which the intake valve clears, at least in part, the flow communication between the intake pipe 7 and the cylinder 2. The first fuel is, for example, a gaseous fuel, in particular natural gas or liquefied gas, and the second fuel is a liquid fuel, for example gasoline or diesel or the like. Especially preferred can be the adjustment in the first operating mode of a higher compression ratio for the cylinder 2 than in the second operating mode. This is realized by the higher anti-knock property of the gaseous fuel as compared to the liquid fuel. For this purpose, the internal combustion engine 1 includes, for example, an adjustment device, not shown here, for the compression ratio by which the piston 9 can be disposed in the cylinder 2 in order to attain the desired geometric compression ratio. In addition or as an alternative, the desired effective compression ratio can be adjusted through suitable selection of the intake valve opening time period.

The internal combustion engine 1 is additionally configured for operation in a third operating mode in which the first fuel is fed exclusively directly into the cylinder 2 via the cylinder direct feed device 6. At the same time, the intake valve opening time period and/or the effective compression ratio are adjusted according to the second operating mode. In this manner, an economical operation of the internal combustion engine 1 is realized with both fuels.

What is claimed is:

1. A method for operating an internal combustion engine, comprising:
   feeding a first fuel in a first operating mode of the internal combustion engine solely into an intake pipe of the internal combustion engine;
   feeding a second fuel in a second operating mode of the internal combustion engine exclusively directly into a cylinder of the internal combustion engine, with the cylinder having an intake valve to control a flow of air in the intake pipe into the cylinder; and
   adjusting an intake valve opening time period in the second operating mode shorter than in the first operating mode.

2. The method of claim 1, wherein the air is fresh air.

3. The method of claim 1, wherein the first fuel is gaseous fuel, and the second fuel is liquid fuel.

4. The method of claim 3, wherein the gaseous fuel is natural gas or liquefied gas.

5. The method of claim 3, wherein the liquid fuel is gasoline.

6. The method of claim 1, further comprising selecting the intake valve opening time period for the first and the second operating modes such that air is supplied to the cylinder at an amount sufficient to effect a predetermined fuel-air ratio.

7. The method of claim 1, further comprising selecting the intake valve opening time period for the first and second operating modes such that a maximum torque of the first and second operating modes is identical.

8. The method of claim 1, wherein the intake valve opening time period extends from an intake valve opening time instance to an intake valve closing time instance, and further comprising selecting the intake valve closing time instance in dependence on a torque of the internal combustion engine and/or selecting the intake valve opening time instance in the first and second operating modes equally at same torque of the internal combustion engine.

9. The method of claim 1, wherein the intake valve opening time period is adjusted continuously.

10. The method of claim 1, wherein the intake valve opening time period is adjusted discretely.

11. The method of claim 1, further comprising adjusting in the first operating mode for the cylinder an effective compression ratio which is higher than an effective compression ratio in the second operating mode.

12. The method of claim 1, further comprising supplying the first fuel in a third operating mode of the internal combustion engine solely into the intake pipe, and adjusting the intake valve opening time period according to the second operating mode.

13. An internal combustion engine, comprising:
   at least one cylinder having an intake valve to control a flow of air in an intake pipe into the cylinder; and
   a fuel supply device configured to supply at least a first and a second fuel and to enable the internal combustion engine to operate in first and second operating modes, wherein the first fuel is fed in the first operating mode solely to the intake pipe and the second fuel is fed in the second operating mode exclusively directly into the cylinder, and an intake valve opening time period is adjusted shorter in the second operating mode than in the first operating mode.

14. The internal combustion engine of claim 13, wherein the air is fresh air.

15. The internal combustion engine of claim 13, wherein the fuel supply device includes a first fuel line for the first fuel and a second fuel line for the second fuel, wherein the first fuel line has a side which faces away from a first fuel tank and is connectable in one of two ways, a first way in which the side is connected solely to an intake pipe feed device of the fuel supply device, a second way in which the side is connected to both the intake pipe feed device and a cylinder direct feed device of the fuel supply device, and wherein the second fuel line has a side facing away from a second fuel tank for exclusive connection to the cylinder direct feed device.

* * * * *